United States Patent [19]

Walter

[11] 4,388,528
[45] Jun. 14, 1983

[54] PHOTOELECTRONIC APPARATUS
[75] Inventor: Arthur Walter, Waldkirch, Fed. Rep. of Germany
[73] Assignee: Erwin Sick Gesellschaft-Optik-Elektronik, Waldkirch, Fed. Rep. of Germany
[21] Appl. No.: 202,280
[22] Filed: Oct. 30, 1980

Related U.S. Application Data
[62] Division of Ser. No. 874,673, Feb. 2, 1978, abandoned.

[30] Foreign Application Priority Data
Feb. 3, 1977 [DE] Fed. Rep. of Germany ....... 2704565

[51] Int. Cl.³ ............................................. H01J 40/14
[52] U.S. Cl. ................................ 250/221; 250/214 B; 250/209
[58] Field of Search ..................... 250/209, 214 B, 221

[56] References Cited
U.S. PATENT DOCUMENTS 3,028,499  4/1962  Farrall ................................... 250/209
3,311,748  3/1967  Volpe et al. ....................... 250/210 X
3,475,613 10/1969  Meyers ............................. 250/209 X
3,486,031 12/1969  Lynch .................................. 250/209
3,500,049  3/1970  Nutz .................................... 250/209
3,521,962  7/1970  Tashiro et al. .................. 250/209 X
3,845,319 10/1974  Walter ............................. 250/209 X

FOREIGN PATENT DOCUMENTS 2144927  9/1971  Fed. Rep. of Germany .
2501244  7/1976  Fed. Rep. of Germany .
1323807  7/1973  United Kingdom .

Primary Examiner—David C. Nelms
Assistant Examiner—Darwin R. Hostetter
Attorney, Agent, or Firm—Townsend & Townsend

[57] ABSTRACT

A photoelectronic apparatus, in which a photoelectric convertor (the operational convertor) receives a beam of light and produces an output signal proportional to the intensity of the light received, is protected against the effects of unwanted light by providing an auxiliary photoelectric convertor arranged in the vicinity of the operational convertor. The auxiliary convertor detects the presence of unwanted light and its output is subtracted from that of the operational convertor and the resultant signal is then examined to distinguish between events occuring in the light beam and events simulated by the unwanted light.

12 Claims, 5 Drawing Figures

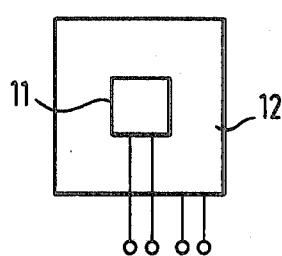
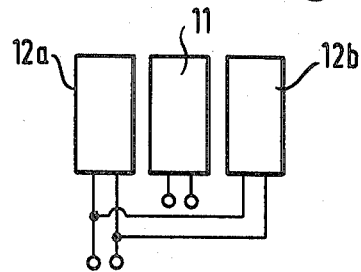
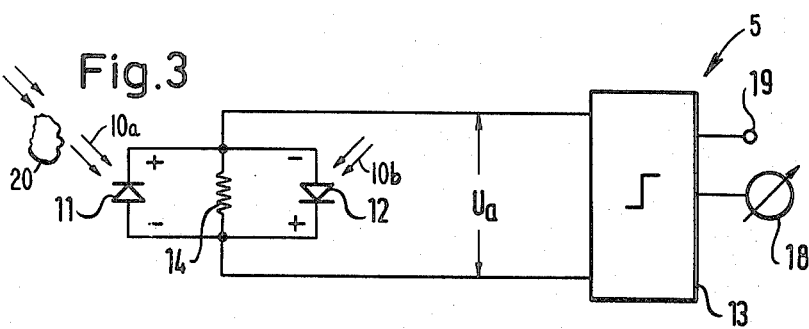
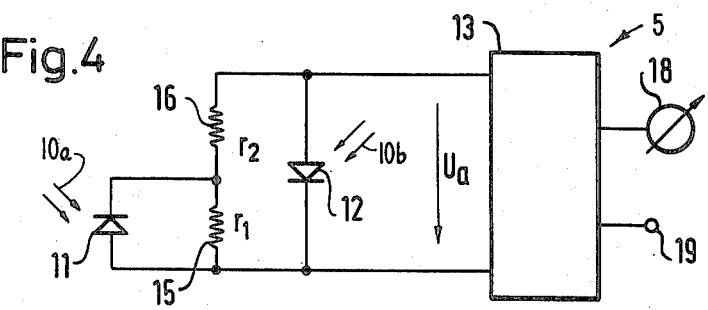
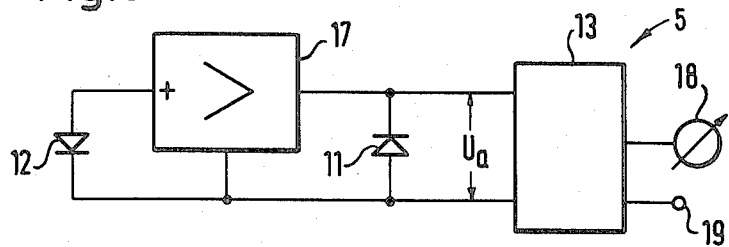

PHOTOELECTRONIC APPARATUS

This is a division of application Ser. No. 874,673, filed Feb. 2, 1978 now abandoned.

The invention relates to a photoelectronic apparatus with at least one photoelectronic operational converter which receives a beam of light of varying intensity and which is connected to an electronic processing circuit which delivers an output signal proportional to the intensity of the beam of light.

In photoelectronic apparatus unwanted light originating from any local light source must continually be taken into account. Such unwanted light can lead to damage to the photoelectronic convertor. If by chance the receiver of a one way light barrier or device is directly illuminated by the sun or another source of radiation of similar strength the receiving objective acts as a lens which concentrates the radiant energy onto the photoelectronic convertor so that this is frequently heated considerably above the permissable limit. Even with lesser radiant power of the unwanted light source the photoelectronic apparatus can suffer damage leading to faults which adversely affect its operation. One particularly unpleasant fault comprises the release of an output signal due to the effects of unwanted light which does not agree with the actual circumstances prevailing in the operational light beam. If the Photoelectronic apparatus is for example a light barrier or device whose output signal depends on whether the light beam is interrupted or not the unwanted light can lead to a failure to recognize the interruption of the light beam by whatever object. This result of the unwanted light is especially dangerous if a photoelectronic safety device is involved, for example a safety light barrier which should release an electrical signal on reduction or interruption of the light beam to show the presence of a dangerous condition.

This disadvantage applies to practically all photoelectronic apparatus, no matter whether they work with constant or intermittent light or whether for example the light beam used contacts a surface or is in the form of a moving beam of light which scans the surface.

The object of the invention is thus to provide a very simple and operationally dependable photoelectronic apparatus of the previously mentioned kind in which, on the occurence of a disturbance from external unwanted light sources, the resulting output signal remains uninfluenced even by the largest possible strengths of the external radiation and which at even higher strengths so influences the processing circuit that the output signal is always biased to the side of safety, i.e. on the occurence of a reduction or interruption of the operational light beam the unwanted light does not prevent the determination of the presence of a dangerous condition.

The unwanted light should also in any event signal the presence of a dangerous condition before it occurs, but should on no account impede the evidence of the presence of a dangerous condition when it actually occurs.

For the solution of this problem the invention provides that an auxiliary photoelectronic convertor which is likewise responsive to the light beam is provided in the region directly alongside the operational convertor and is connected in opposition to the operational convertor so that, when light is incident on the auxiliary convertor, a reduction of the signal passed to the processing circuit is brought about which is proportional to the intensity of the light incident on the auxiliary convertor.

In this manner the presence of unwanted light brings about a reduction of the signal passed to the processing circuit which, on the occurence of a particular intensity of the unwanted light can be used in a circuit procedure which corresponds to the occurence of an event which should be determined by the photoelectronic apparatus and which is associated with a reduction of the quantity of light passed to the operational convertor.

This circuit procedure can then for example initiate a safety measure and determine whether it is the relevant event or unwanted light which has given rise to the circuit procedure.

In this manner unwanted light is prevented from giving rise to a signal which would normally be associated with a reduction of the intensity of the operating light beam at the operational convertor, in that the signal is only given when the perceived light intensity falls below a given threshold corresponding to the intensity of the operational light beam. The presence of unwanted light therefore biases the circuit procedure and the associated output to the side of safety.

The invention begins from the point of view that the location of the unwanted light source can not, on geometrical grounds, be the same as the actual light source for the apparatus. With photoelectronic apparatus that use the principle of autocollimation the location of the unwanted light source is not, on geometrical grounds, that of the reflector. Correspondingly the location of the image of the unwanted light source on the photoelectronic convertor will, on the assumption of ideal imaging conditions, be elsewhere than the location of actual light source or reflector, i.e. that the image of the unwanted light source will lie alongside the photoelectronic convertor. An auxiliary convertor arranged directly in the vicinity of the operational convertor must therefore receive essentially the unwanted light which can then be used in accordance with the invention to provide a signal at the signal output which is biased to the side of safety.

Preferably the auxiliary convertor borders on the operational convertor. In order to sense all the unwanted light the auxiliary convertor usefully surrounds the operational convertor. A plurality of auxiliary convertors can also be arranged around the operational convertor and be connected together.

By the insertion of corresponding orifices, and especially with travelling beam apparatuses, the arrangement can be such that the auxiliary convertor comprises two individual convertors which are arranged to either side of the operational convertor and which are connected together in parallel. In this case the unwanted light source can be at any location, and indeed can even be located in front of the reflector.

According to a first practical embodiment the operational connector and the auxiliary convertor are directly connected in opposition to one another across a resistor arranged at the input side of the processing circuit. This embodiment preferably works with a type of processing circuit which has a circuit threshold so that below a certain input current a first digital indicating signal is delivered (e.g. O) and above the circuit threshold the circuit delivers another digital output signal (e.g. L). If the circuit threshold is sufficiently low an interruption of the operational light beam is indicated without any trouble up to a predetermined unwanted light level. Above a predetermined unwanted light level the input current falls below the circuit threshold when the light beam is not impeded. Thus an interruption of the light beam is simulated so that the unwanted light biases the apparatus to the side of safety in accordance with the aims of the invention.

Because ideal optical imaging conditions are not generally to be expected and especially because it must be expected that unwanted light will also fall on the operational convertor a preferred embodiment of the invention provides that the operational and auxiliary convertors are so connected in opposition to one another that the influence of the auxiliary convertor is greater than that of the operational amplifier. This is achieved in one embodiment by providing in the input circuit of the processing circuit two resistances in series across one of which the operational convertor is connected whilst the auxiliary convertor is connected with opposite polarity across both resistances. By a suitable choice of the size of the two resistances an adjustment to the sensitivity can be made.

Another advantageous possibility is that the auxiliary convertor is connected in opposition to the operational convertor via an amplifier. The amplifier is not allowed to produce any phase change because the auxiliary and operational convertors deliver voltages of opposite polarity.

Embodiments of the invention will now be described by way of example only and with reference to the accompanying drawings in which is shown FIG. 1 a schematic plan view of a first preferred arrangement of the convertor of a photoelectronic apparatus in accordance with the invention, FIG. 2 a schematic plan view of a further advantageous arrangement of the convertor of a photoelectronic apparatus in accordance with the invention which is particularly suited for use with a moving light beam.

FIG. 3 a schematic circuit block diagram of a first circuit for the convertor arrangment of a photoelectronic apparatus in accordance with the invention.

FIG. 4 a schematic circuit block diagram of a further especially preferred circuit for the convertor arrangement for a photoelectronic apparatus in accordance with the invention and FIG. 5 a schematic circuit block diagram of a further possible circuit arrangement which works similarly to the circuit of FIG. 4.

The figures illustrate a photoelectronic apparatus 5 constructed in accordance with the invention.

In FIG. 1 an auxiliary convertor 12 is arranged around an operational convertor 11 which in operation receives the operational light beam 10a; in general the auxiliary convertor 12 receives only the unwanted light 10b.

In contrast FIG. 2 shows a linear arrangement in which auxiliary convertors 12a, 12b are arranged on both sides of the operational convertor 11, the auxiliary convertors are shown connected together in parallel. The convertor arrangement, in accordance with the invention, has in each case an output from the operational amplifier and an output from the auxiliary amplifier.

In FIG. 3 the operational amplifier 11 and the auxiliary amplifier 12 are connected in the input circuit of an electronic processing circuit 13 in opposition to one another across a resistor 14. Because the convertors, which preferably are constructed of photoelectric components, operate in short circuit with low resistance terminals they can be regarded as current sources with infinitely high resistance and the following relationship holds for the current $i_1$ of the operational convertor 11 of FIG. 3.

$$U_1 = i_1 \cdot R \quad (1)$$

Similarly the following relationship holds for the current $i_2$ of the auxiliary convertor 12:

$$U_2 = i_2 \cdot R \quad (2)$$

The output potential $U_a$ applied to the processing circuit 13 is therefore $$U_a = (i_1 - i_2) \cdot R \quad (3)$$

From this relationship it is clear that if $i_1 = i_2$ then $U_a = 0$.

The processing circuit 13 is one that has a digital output which has a threshold value for the size of the input. This threshold value will be designated $i_s$. When $i_2 = 0$ and when $i_1 \geq i_s$ the circuit will be switched to one state when $i_1 < i_s$ it will be switched to another inoperative state. With ideal operating conditions i.e. operation without the presence of unwanted light the circuit works as intended. If unwanted light should be present an increasing current $i_2$ is present so that with higher values of $i_1$ the current can fall below the threshold value $i_s$. A dangerous condition indicated by the current falling below the normal value of $i_1$ will thus be indicated before this condition is reached, i.e. at all events before it is too late. By choosing the value of $i_s$ to be not too large it can be arranged that the current falls below the threshold value only on the occurence of a large current $i_2$ due to the presence of unwanted light 10b.

At the output of the processing circuit there is generally some apparatus 18 such as a signal lamp for indicating the condition of the light barrier apparatus 5. An output 19 can be used via suitable circuitry to initiate whatever safety measures are necessary.

In general however ideal optical imaging conditions are not to be expected in the photoelectronic apparatus 5 because for example no quality objective with the necessary corrections is likely to be used for focusing of the operational light beam 10a on the operational convertor. In this case it should be taken into account on the one hand that a part of the operational light will fall on the auxiliary convertor 12 and on the other hand that a part of the unwanted light will fall on the operational convertor. Because there is an abundance of possibilities for the intensity and arrangements of unwanted light sources that can arise it is hardly possible to make a generally applicable statement of the distribution of radiation on the convertor arrangement. Accordingly it is sensible to regard a constant distribution of the unwanted light over the surfaces of the convertors 11, 12 as the most unfavourable case. This also corresponds to the conditions occuring with a moving beam of light.

Here, with a corresponding geometrical arrangement of the disturbing light source, the case can arise in which the operational convertor 11 receives no light when an obstruction 20 is detected, but only unwanted light. If unwanted light were strong enough to generate a current in the convertor which exceeds the threshold value the obstruction would not be detected. If however in contrast to the obstruction the unwanted light source generates a current at the auxiliary convertor 12 whilst the operational light 10a impinges on the operational convertor 11 then the first must be so large that the difference of the currents does not exceed the threshold value.

These conditions can prevail with the current of FIG. 4. If one considers once more the convertors 11, 12, which are constructed of photoelectric components, to be current sources of infinitely large internal resistance then the operational convertor 11 delivers a current $i_{11}$ which produces a potential drop $U_{11}$ at a resistor 15 connected across the convertor and having a value $r_1$ of $$U_{11} = i_{11} \cdot r_1 \tag{4}$$

The resistance 15 is in series with a further resistance 16 of value $r_2$ and the two series connected resistors are connected across the input to the electronic processing circuit 13 and also connected in parallel with the auxiliary convertor 12. The auxiliary convertor 12 and the operational convertor 11 are once more connected in opposition to one another.

Because of this arrangement the potential drop $U_{12}$ due to the current $i_{12}$ of the auxiliary convertor 12 is given by $$U_{12} = i_{12} \cdot (r_2 + r_1) \tag{5}$$

The output potential $U_a$ which is applied to the processing circuit 13, on the assumption that the input resistance $R_a$ of the processing circuit 13 is infinite is given by $$U_a = i_{11} \cdot r_1 - i_{12} \cdot (r_1 + r_2) \tag{6}$$

In the case that the input resistance is finite the following relationship holds for the potential drop $U_a$ $$U_a = [i_{11} r_1 - i_{12}(r_1 + r_2)] \frac{R_a}{R_a + r_1 + r_2} \tag{7}$$

$$U_a = \left[ i_{11} - i_{12} \frac{r_1 + r_2}{r_1} \right] \frac{R_a \cdot r_1}{R_a + r_1 + r_2} \tag{8}$$

It can be recognised from this that the current $i_{12}$ of the auxiliary convertor is more effective by a factor of $(r_1 + r_2)/r_1$ than the current $i_{11}$ of the operational convertor 11. By a suitable choice of these factors the response of the apparatus can be adjusted so that the presence of unwanted light of a corresponding strength will produce a signal at the output of a so equipped photoelectronic apparatus 5 that is biases the apparatus to the side of safety. The safety achieved in this manner is thereby so large that, especially in the case of apparatuses using moving light beams and even when unwanted light source is in front of the reflector, the presence of unwanted light sources in the area, to be monitored will be indicated as an obstruction.

The sensitivity to unwanted light can indeed also be diminished by the use of aperture stops, filters and the like but not however to the extent that the apparatus in accordance with the invention becomes unnecessary. Aperture stops and filters can however be used as additional measures to assist in ariving at the desired result. The use of appropriate aperture stops is especially beneficial, e.g. with moving operational light beams, as they can enable an operational convertor 11 to be used with only two auxiliary convertors 12a, 12b (FIG. 2) in place of a single auxiliary convertor or a multiplicity of convertors which would otherwise have to be arranged around the operational convertor.

An alternative circuit shown in FIG. 5 can be used in place or the circuit shown in FIG. 4. In the circuit of FIG. 5 the auxiliary convertor and the operational convertor are connected in opposition across an amplifier 17 and this is once again done in such a manner that the influence of the or each auxiliary convertor 12 is greater than that of the operational convertor. Adjustment of the sensitivity can be simplified by the use of a variable gain amplifier. The amplifier 17 is so arranged that it produces no phase change. In as much the input resistance of the processing circuit 13 has the value RA and the amplification of the amplifier 17 is V a potential $U_a$ is obtained at the input to the processing circuit equal to $$U_a = (i_{11} - V \cdot i_{12}) \cdot RA \tag{9}$$

with a very low impedance input to the processing circuit 13 an input current $i_a$ is present equal to $$i_a = i_{11} - V \cdot i_{12} \tag{10}$$

A similar manner of operational is thus present in this case as in the previous embodiment as can be seen by comparison with the equivalent equations (7) and (8).

I claim:

1. Photoelectronic apparatus having photoelectric convertor means including a first operational photoelectric convertor which in operation is adapted to receive a light beam from a source, a processing circuit adapted to process an output from the photoelectric convertor means to generate a control signal in response to an obstruction of the light beam, and protective means adapted to prevent the photoelectronic apparatus from failing to recognize the obstruction in the presence of unwanted stray light, the protective means comprising a second auxiliary photoelectric convertor disposed in the immediate vicinity of the first operational photoelectric convertor, and circuit means for forming a weighted difference signal between the outputs of the first operational photoconvertor and the second auxiliary photoconvertor, the last mentioned means determining a predtermined threshold for stray light below which the photoelectric convertor will always deliver the control signal in the presence of the obstruction irrespective of the level of stray light and above which as a safety measure the control signal will always be delivered irrespective of whether the beam is obstructed or not.

2. Photoelectronic apparatus according to claim 1 wherein the auxiliary photoelectric convertor comprises at least two individual photoelectric convertors connected in parallel and disposed on either side of the operational convertor.

3. Photoelectronic light barrier apparatus comprising: light source means for producing an operational light beam; light receiving means including an operational photoelectric convertor disposed in fixed disposition with respect to said light source means to receive said operational light beam, and an auxiliary photoelectric convertor arranged in the immediate vicinity of said operational photoelectric convertor and positioned outside the light beam so as to receive substantially no light from said light source means but so as to receive stray light incident on said light receiving means; an electronic processing circuit; circuit means operatively coupled with the convertors for forming a weighted difference signal from the outputs of the auxiliary convertor and of the operational photoelectric convertor and for passing the weighted difference signal to the electronic processing circuit; the electronic processing circuit including means defining a threshold and adapted to produce a first signal when said weighted difference signal exceeds said threshold and a second signal when said weighted difference is less than said threshold, one of said first and second signals indicating the presence of an obstruction in said light beam and the other being indicative of the absence of an obstruction in said light beam; the circuit means applying a level of weighting in forming said weighted difference signal which defines a threshold for stray light below which the photoelectric light barrier apparatus is compensated for the effects of stray light to reliably indicate the presence of an obstruction and above which the light barrier apparatus will always indicate the presence of an obstruction irrespective of whether or not an obstruction is actually present.

4. Photoelectronic apparatus in accordance with claim 3 wherein the auxiliary photoelectric convertor directly borders on the operational photoelectric convertor.

5. Photoelectronic apparatus according to claim 3 wherein the auxiliary photoelectric convertor surrounds the operational convertor.

6. Photoelectronic apparatus according to claim 3 wherein the auxiliary photoelectric convertor comprises at least two individual photoelectric convertors connected in parallel and disposed on either side of the operational convertor.

7. Photoelectronic apparatus according to claim 3 wherein the operational and auxiliary photoelectric convertors are connected directly together in parallel across a resistor at the input to the processing circuit.

8. Photoelectronic apparatus according to claim 3 wherein the said operational and auxiliary photoelectric convertors are so connected together opposition in that the effect of the auxiliary convertor is greater than that of the operational convertor.

9. Photoelectronic apparatus according to claim 8 wherein two series connected resistors are provided at the input side of the processing circuit, and wherein the operational photoelectric convertor is connected across one of the resistors and the auxiliary photoelectric convertor is connected with reversed polarity across both said resistors.

10. Photoelectronic apparatus according to claim 8 wherein the auxiliary photoelectric convertor is connected via an amplifier in opposition to the operational photoelectric convertor.

11. Photoelectronic apparatus according to claim 3 wherein the processing circuit comprises a circuit having a threshold value.

12. Photoelectronic apparatus according to claim 9 wherein the auxiliary photoelectric convertor is connected via an amplifier in opposition to the operational photoelectric convertor.

* * * * *